(12) United States Patent
Wagner et al.

(10) Patent No.: US 6,859,885 B2
(45) Date of Patent: Feb. 22, 2005

(54) DATA RECEPTION METHOD

(75) Inventors: Thomas Wagner, Reutlingen (DE);
Eberhard Boehl, Reutlingen (DE);
Andrej Morosov, Potsdam (DE)

(73) Assignee: Robert Bosch GmbH, Stuttgart (DE)

( * ) Notice: Subject to any disclaimer, the term of this patent is extended or adjusted under 35 U.S.C. 154(b) by 426 days.

(21) Appl. No.: 10/000,386

(22) Filed: Nov. 30, 2001

(65) Prior Publication Data

US 2002/0099999 A1 Jul. 25, 2002

(30) Foreign Application Priority Data

Nov. 30, 2000 (DE) .......................................... 100 59 758

(51) Int. Cl.⁷ ................................................ H04J 3/06
(52) U.S. Cl. ...................... 713/401; 713/400; 713/600; 370/503
(58) Field of Search ................................ 713/400, 401; 370/503

(56) References Cited

U.S. PATENT DOCUMENTS

| | | | | |
|---|---|---|---|---|
| 5,432,823 A | * | 7/1995 | Gasbarro et al. | ........... 375/356 |
| 5,509,038 A | * | 4/1996 | Wicki | .......................... 375/371 |
| 5,551,050 A | * | 8/1996 | Ehlig et al. | .................... 714/11 |
| 6,205,191 B1 | * | 3/2001 | Portmann et al. | ........... 375/354 |
| 6,473,439 B1 | * | 10/2002 | Zerbe et al. | ................. 370/503 |
| 6,526,485 B1 | * | 2/2003 | Moudgal et al. | ............. 711/159 |

FOREIGN PATENT DOCUMENTS

DE          44 29 525          3/1995

* cited by examiner

Primary Examiner—A. Elamin
(74) Attorney, Agent, or Firm—Kenyon & Kenyon

(57) ABSTRACT

A data reception method is described in which errors due to a phase shift between the data signals and the clock pulse are compensated in data signals transmitted at a constant frequency with the receiving device operating at this frequency by operating two readout devices with a time offset, and a signal output by one of the readout devices is selected, after which this signal is checked for validity. This makes additional transmission of an operating clock pulse via a bus system and synchronization of an input signal with an operating clock unnecessary.

19 Claims, 4 Drawing Sheets

DATA RECEPTION METHOD

FIELD OF THE INVENTION

The present invention relates to a data reception method.

BACKGROUND INFORMATION

International Patent Application No. 99/19806 describes a bus system in which signals are transmitted at a constant frequency between individual units connected to the bus. If such a signal is sent to the bus by a first unit connected to the bus, the signal is delayed due to the signal transit time, especially in the case of very long bus systems and, in particular, because of the switching times in other units connected to the bus. If the signal is then looped back to the first unit connected to the bus, the signal is usually phase shifted with respect to the emitted signal and therefore with respect to the operating clock of the first unit, while the frequency of the signal itself is still the same. When the signal looped back to the first unit is sampled, the phase shift may cause errors, in particular in the case when the looped-back signal changes during just a period of time when a readout device in the first unit switches according to the operating clock of the first unit. In such a unit, an input signal is sent to two flip-flops, one flip-flop receiving the signal applied to a data input with a rising edge of the receiving device's operating clock and the second flip-flop with a falling edge of the receiving device's operating clock. The phase of the operating clock is compared to the phase of the input signal using a phase measuring circuit, and either the output signal of the fist flip-flop or the output signal of the second flip-flow is selected via a multiplexer for further processing as a function of the measured phase. The flip-flops are controlled using the operating clock of the receiving device; therefore, the new signals are synchronized with the operating clock of the receiving device.

A square signal 3 corresponding to the operating clock is shown in FIG. 2 as a function of time. Time periods 6 for the input into the first flip-flop during which the input signal is allowed or is not allowed to change are shown for square signal 3. Furthermore, similar time periods 7 are shown for the second flip-flop, in which the input signal is allowed or is not allowed to change. For the flip-flop which switches to a falling clock edge 2, the input signal is not allowed to change in a time period 4, since during the switching period of the flip-flop the status is indefinite and therefore detection of the data signal during this period may cause errors. During the remaining time periods 5, however, the input signal may change. For time periods 7 for the flip-flop switching to a rising clock edge 1, a distinction is also made between allowed time periods 5' and unallowed time periods 4' in the vicinity of the rising clock edge. Unallowed time periods 4, 4' are disjoined in time, since the two clock edges are shifted with respect to one another by half a period, and the switching period of the flip-flops is less than half a period. The input signal is applied at a constant frequency, so that a change in the input signal occurs in a switching period always at the same phase angle, although at an unknown point in time. Therefore, this point in time is located either in an allowed time period 5 or in an allowed time period 5', so that at least one correct signal is available. According to International Patent Application No. 99/19806, an output signal of one of the two flip-flops is selected by comparing the phase of the clock pulse of the input signal with that of the operating clock of the receiving device; at least one flip-flop must then output correct data assuming correct transmission. A complex circuit, requiring an integrator, i.e., an analog component, is required for determining the phase difference. In addition, a clock pulse of the input signal, which must also be transmitted, must be available.

SUMMARY

An example data reception method according to the present invention may have the advantage that the output signals of the readout devices are checked for validity. Thus, clock pulse recovery using a clocking device, e.g., a PLL, or clock pulse transmission are not needed in a receiving device which is, for example, a master unit of a bus system and defines the clock frequency of the bus system when the data modified by transmission over the network is received. Neither is phase comparison between the operating clock and an input clock needed. Therefore, an additional data transmission line for transmitting the clock pulse can also be omitted. In particular, analog circuit components for a phase measuring circuit, as needed for an integrator, for example, can be omitted, which allows for a simpler circuit. Furthermore, by checking the validity of the signals, it can be established whether a transmission has taken place without errors, so that transmission errors can be directly determined during the check.

It may be particularly advantageous if the phase of the first clock pulse is shifted by half a period with respect to the phase of the second clock pulse, i.e., the readout devices operate with the same clock input signal, but store an incoming data signal to be received at opposite edges of the clock signal separated by half a period, since this guarantees the greatest possible interval between the time periods in which the input signal may not change because the readout devices are activated during these periods.

It may be further advantageous if a switching device which selects a valid signal is activated using a checking device for determining the validity of the signals. It may be particularly advantageous if the results of the check and thus the decision regarding the signal selected are stored in the checking device, in order to make ongoing checking possible; however, if nothing changes in the signal path of the input signal, the result of the check is available even without any further computational check.

It may be furthermore advantageous if the signals are transmitted in an encoded form, since the validity of the signals can be determined in a simple manner by checking the correctness of a transmitted code. In particular, it can be decided quickly and in a simple manner whether the transmitted data is correct by forming a check value, e.g., using the transmitted parity data or adding up certain data values (e.g., when using a CRC code).

It may be further advantageous if, when the validity of the data is not determined, an error signal is output, so that the downstream devices connected to the data receiving device, for example, a computer device, which process the signal output by the receiving device, are informed that the data transmitted at a given point in time may be incorrect. Different error signals can be output depending on whether both signals are invalid or only one signal is invalid. If the invalidity of both input signals is determined, it is assumed that the transmission is unreliable, so that specific response measures can be taken, for example, by repeating the transmission or by transmitting test signals.

It may be further advantageous to obtain a clock pulse from the data signal, so that the receiving device itself does not need to have its own clock generator with its own time base, as can be provided by an oscillating quartz, for example. When using different time bases, deviations in the frequency in different devices may result in errors, so that when the clock signal is obtained from the data signal in a bus system, only one unit connected to the bus needs to have a clock generator with its own time base.

The requirements for a clocking circuit, for example, a PLL (phase-locked loop), in a node of the bus system having no time base of its own are not very strict, since only the frequency, but not the exact phase angle, must be determined, since a checked and valid signal is presumed to have a correct phase angle. Likewise, irregularities in the clock edge, for example, slight time shifts of the clock edge, have no disturbing effect as long as the overall clock frequency remains constant. Furthermore, no clock signal transmission over additional bus lines is required.

It may be further advantageous to transmit data to the checking device via an external terminal in order to determine validity, so that the checking device can be adjusted in the event of a modified transmitted signal code.

DETAILED DESCRIPTION

The method according to the present invention may be used, for example, in data bus systems having a ring-shaped arrangement of electrical apparatuses, i.e., in which data output by one unit may be modified and looped back to this unit. In general, one of the electrical apparatuses is designed as a clock-determining active apparatus, known as a master. All the other electrical apparatuses in the network defined by the data bus system are designed as passive apparatuses which do not have a clock generator of their own and are known as slaves. The transmitted data is coded, so that errors can be detected, and each slave can recover, from the data, the clock pulse that has not been transmitted with the data using a special electric device, e.g. a PLL (phase-locked loop). For this purpose, the logic level of the transmitted data signal must change, possibly multiple times, at least after a certain number of transmitted data bits in order to allow constant synchronization of the electric device for obtaining the clock pulse with the transmitted data bits.

Figure 1:
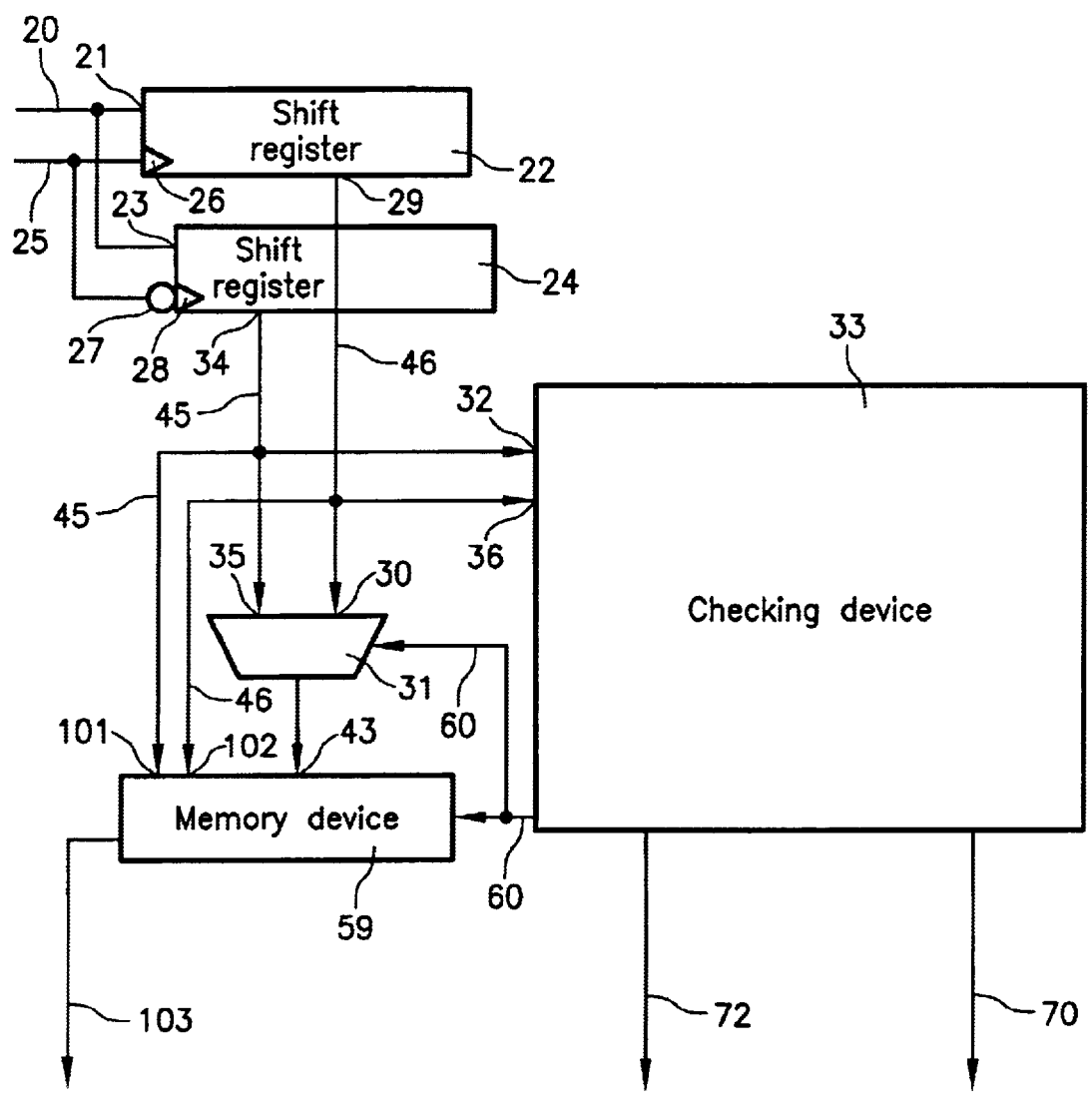
FIG. 1 shows a circuit diagram of a data reception device according to the present invention.
Figure 3:
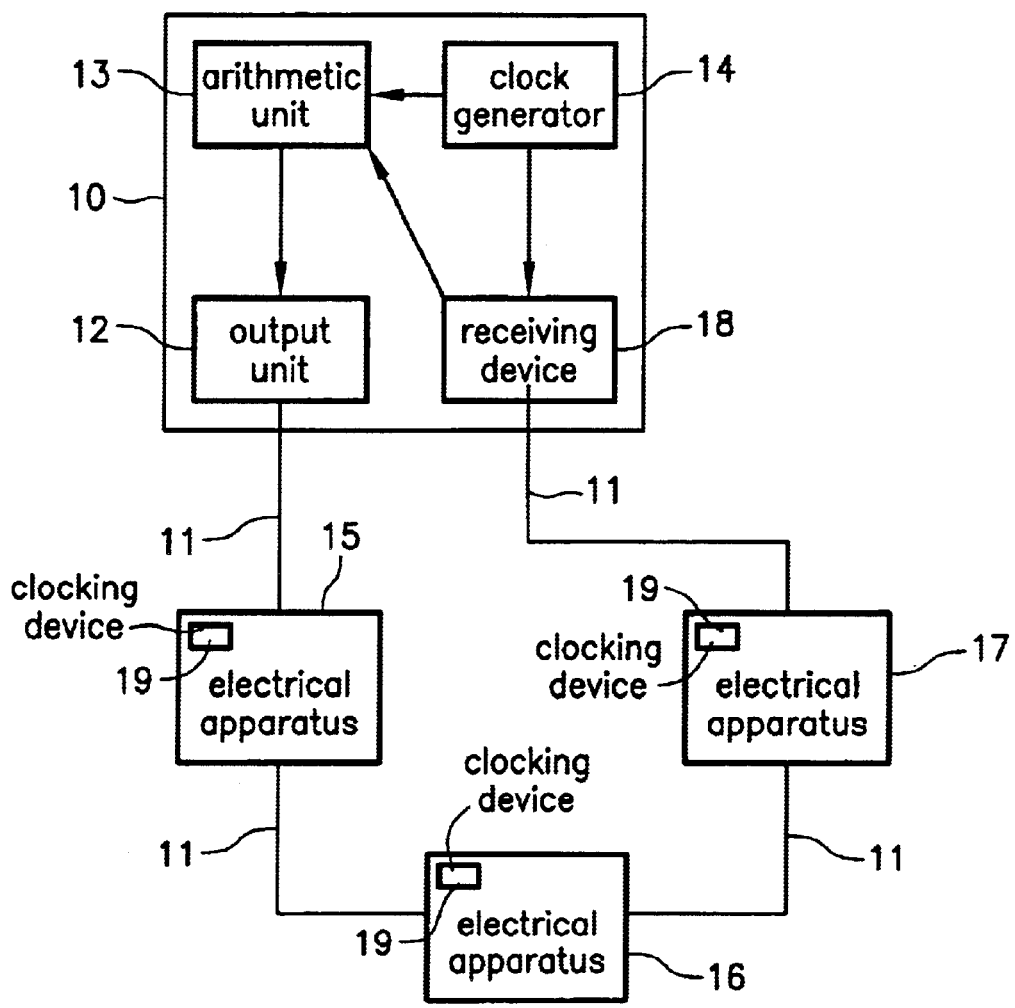
FIG. 3 shows a data bus system according to the present invention.

FIG. 1 shows a circuit diagram of an example data reception device according to the present invention for receiving data according to the method of the present invention. The device shown in FIG. 1 is built into an electrical apparatus which is connected to other electrical apparatuses via a data bus. FIG. 3 is a simplified block diagram of this arrangement.

FIG. 3 shows a first electrical apparatus 10 which is connected to a data bus 11. Signals are supplied to data bus 11 via an output unit 12 of first electrical apparatus 10. The signals are generated by an arithmetic unit 13 of first electrical apparatus 10. First electrical apparatus 10 may be used as a master, i.e., as a main control device of data bus 11. An operating clock of first electrical apparatus 10 is generated via a clock generator 14. The signals are sent by output unit 12 to data bus 11 with this operating clock. Data bus 11 goes through a second electrical apparatus 15, a third electrical apparatus 16, and a fourth electrical apparatus 17. The signals from first electrical apparatus 10 received via data bus 11 are received by a receiving device 18 according to the present invention and are relayed to arithmetic unit 13 for further processing. Receiving device 18 according to the present invention adjusts the signal received via data bus 11 to the operating clock which is generated by clock generator 14 and with which receiving device 18 is also controlled. Preferably no clock signal is transmitted via data bus 11 itself, so that an operating clock is determined from the data signal by clocking devices 19, which are arranged on second electrical apparatus 15, third electrical apparatus 16, and fourth electrical apparatus 17. Clocking devices 19 may be integrated in electrical apparatuses 15, 16, 17 or arranged on same externally. Data bus 11 may be designed as an electrical or optical data bus, for example. Furthermore, the connection may be designed as a wireless connection, for example, a radio connection. The bus system described in FIG. 3 may be used in, for example, a motor vehicle. The electrical apparatuses may be either control devices for the power train or the brake system, or multimedia/communication devices in the vehicle such as a radio set, a music player, a navigation device, a TV set, or a car phone, which are connected, controlled, and can exchange information via the bus.

FIG. 1 shows receiving device 18 in detail. An input signal 20 is conducted by data bus 11 to a first input 21 of a first shift register 22 and to a first input 23 of a second shift register 24. An operating clock signal of receiving device 18 is conducted to a control input 26 of first shift register 22, which processes the data received at first input 21 with a first clock edge of the signal, here with the rising clock edge. Furthermore, operating clock signal 25 is supplied to a control input 28 of second shift register 24, which processes the data received at first input 23 with a second clock edge of the signal, here with the falling clock edge. Control via a second clock edge is labeled by symbol 27 in FIG. 1. In another embodiment, an inverter can also be connected upstream from control input 28 of second shift register 24 or integrated in the second shift register, if the second shift register switches with the same clock edge as the first shift register. In this case, however, a time delay of the clock signal due to the inverter may cause time periods 4' and 5' to shift with respect to 4 and 5 (see FIG. 3).

Operating clock signal 25 for controlling receiving device 18 may be, for example, a square signal. In the selected exemplary embodiment, first shift register 22 switches at a rising clock edge, and second shift register 24 switches at a falling clock edge. First shift register 22 reads out input signal 20 at a rising clock edge received via control input 26 and stores it in a first register of the shift register. The remaining data is shifted by one register position and the data value of first shift register 22 is relayed as a first output signal 46 to a first input 30 of a switching device 31, to a first input 32 of a checking device 33, and to a first input 101 of a memory device 59 via an output 29 of first shift register 22. Second shift register 24 switches at a falling clock edge and also reads out input signal 20 at this time. Furthermore, second shift register 24 relays the data signal stored in the shift register as a second output signal 45 to a second input 35 of switching device 31, to a second input 36 of checking device 33 and to a second input 102 of memory device 59 via an output 34 of second shift register 24, which is parallel to output 29. First output signal 46 and second output signal 45 transmitted to checking device 33 are checked for validity in checking device 33. After checking, checking device 33 outputs a selection signal 60 to memory device 59 and switching device 31, with which a valid signal is selected from the two output signals 45, 46. Furthermore, checking device 33 outputs a confidence signal 70 and an error signal 72. Confidence signal 70 is output if at least one of output signals 45, 46 is found to be valid, and second error signal 72 is output if it is determined that both output signals 45, 46 are invalid. The valid data can be read out from memory device 59 via an output 103, e.g., by arithmetic unit 13, which can also query confidence signal 70 and error signal 72.

Figure 2:
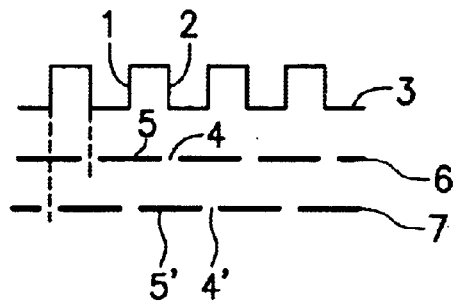
FIG. 2 shows the variation over time of an operating clock signal and periods in which the input signal may and may not change for both control devices.

The representation of an operational clock and allowed and unallowed time periods in FIG. 2 can also be transferred to the present data reception device according to the present invention and the method according to the present invention, first shift register 22 switching at rising clock edge 1, and second shift register 24 switching at falling clock edge 2, for example.

The data signals may be transmitted in an encoded form, and the validity of the signal is checked by checking device 33 by checking the encoding specification. If the code, for example, an error detection code, is a party bit code, either the total number of encoded bits is stored in first shift register 22 or second shift register 24 and checked for the number of ones and zeros, or, if shift registers 22, 24 are shorter, the entire encoded signal can also be first stored in a memory and the code specification can be checked by calculation in a subsequent time period. Part of the code contained in shift registers 22, 24 can also be checked in checking device 33 according to FIG. 1, and the interim result of the check can be stored in checking device 33. This interim result is then used again for checking the next shift register content until the entire code word has been checked and thus a decision can be made regarding the validity of the data. Even in this case, the data of both shift registers must be temporarily stored in a memory until a decision can be made by checking device 33 regarding validity. Instead of a parity bit code, other codes such as a CRC code (cyclic redundancy code) can also be used.

In order to check the validity of the data in shift registers 22, 24, the reception of key words can also be checked. Such key words are often used with bus systems in order to mark the beginning or the end of a message, such as start bits or stop bits or preambles with four specially encoded bits to mark the beginning of a message, for example. If, in addition, the length of the message is fixed and the transmission is done periodically, a key word is expected to be detected in periodically equal intervals. For this purpose, a counter in checking device 33 can be set to a certain value (e.g., zero) whenever such a key word is detected and the number of subsequent clock pulses can be counted. For example, if no key word is detected at a subsequent point in time when a key word is expected again, the data received to that point is not considered valid.

It must also be taken into account that valid data can be received in both shift registers 22, 24 if the data for first shift register 22 changes during time period 5 and the data for second shift register 24 changes during time period 5'. Since time periods 5 and 5' partially overlap, in this case a coding error is not detected in either shift register and the key words are also detected at the expected point in time. In this case, however, parallel output data 45 and 46 are the same except for a possible shift by one bit.

Due to the shift, at least one of the shift registers is read out one bit more than necessary for code detection and key word detection.

The following conditions for the two parallel output signals 45, 46 may arise during data reception:
1. the sets of data are error free and identical
2. the sets of data are error free and identical, but shifted by one bit with respect to one another
3. both sets of data are error free, but different from one another
4. only the data of one shift register is error free
5. the data in both shift registers contains errors.

For cases 1 and 2, the data of any predefined shift register is processed. In case 4, the data of the error free shift register is further processed. In case 5, the error signal is set and no data is selected for further processing. Case 3 is a special case: the data in at least one shift register is obviously wrong, but no decision can be made as to which one. It may be that the selected code is insufficient regarding its error-detection properties, e.g., a parity bit code, which can only detect a single error while two bit errors are present in one shift register, or the code check does not take place until the entire code word has been received which has not yet occurred, or the key word has not yet been checked. In this case, no decision can be made first but, unless case 4 arises, the error signal must be set as soon as the code word and/or the key word have been checked at the latest. The occurrence of case 3 can be counteracted by appropriate encoding of the data, so that data 45, 46 can be assigned to one of cases 1, 2, 4, or 5 at any time.

Figure 5:
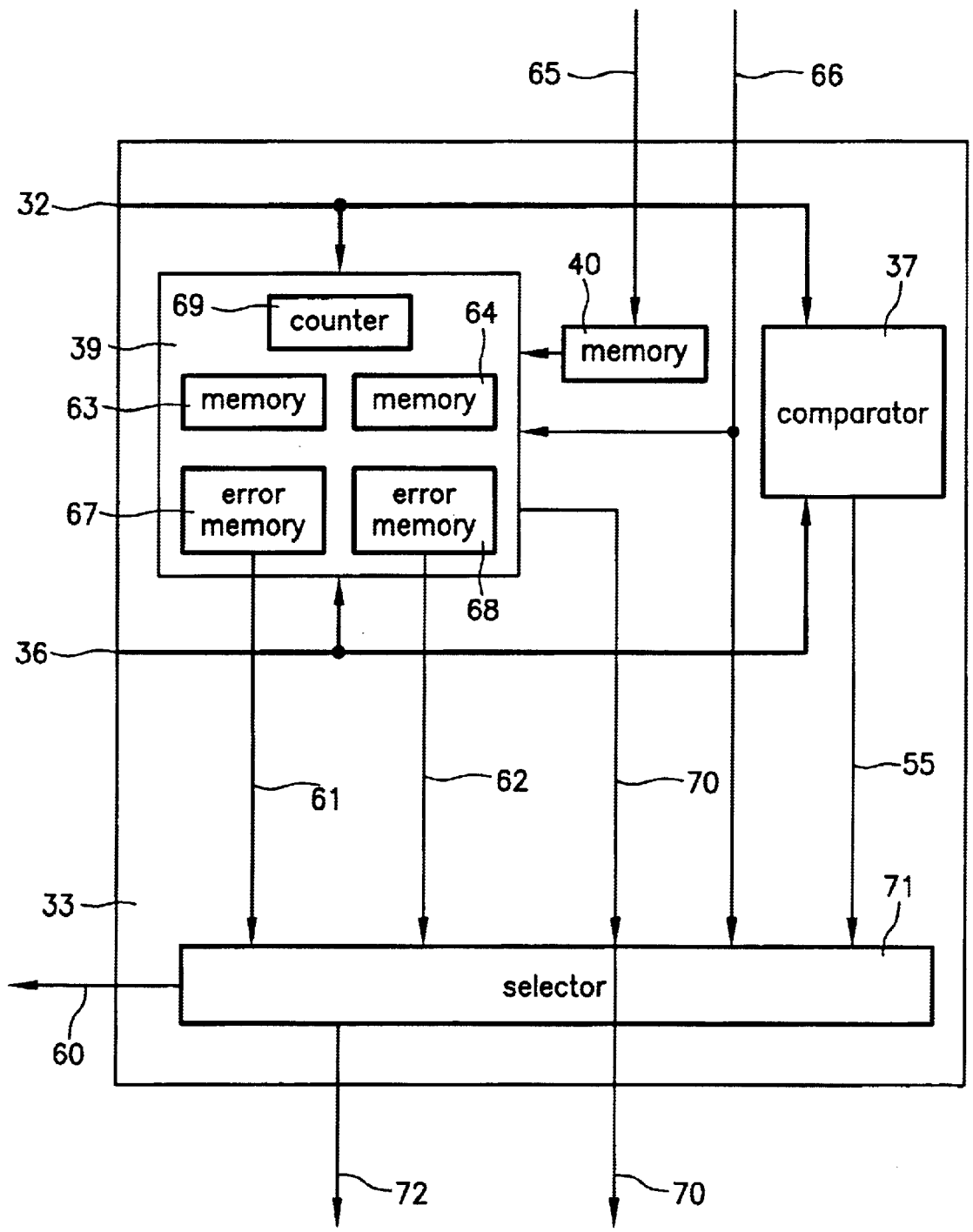
FIG. 5 shows a checking unit for checking the validity of the signals in detail as part of a data reception device according to the present invention.

FIG. 5 shows the checking device in detail. Here and in the following, the same reference symbols denote the same elements. First input 32 and second input 36 of checking device 33 are connected to a comparator 37, which checks wither first output signal 46 is identical to second output signal 45, or whether the two output signals 45, 46 are shifted by a maximum of one bit with respect to one another. The comparator outputs a comparison signal 55 to a selector 71, with which selector 71 determines whether the two signals at inputs 32, 36 are identical except for a shift of maximum one bit. Furthermore, the signals at first input 32 and second input 36 are each transmitted to a code checking device 39. Code checking device 39 checks, according to a code checking specification stored in a memory unit 40, whether output signals 45, 46 correspond to the encoding specifications. If an error is detected by code checking device 39, a first error memory 67 is set for the first output signal and/or a second error memory 68 is set for the second output signal. The status of the error memory is signaled via a first error signal 61 for first error memory 67 and by a second error signal 62 for second error memory 68 of selector 71. The code checking specification can be loaded in memory unit 40 preferably via a data input 65 or modified so that the code to be checked can be adjusted to the prevailing conditions, for example, to the code used in the bus system. The code is checked, depending on the code, for example, by determining the number of ones in the code word when a parity code is used, by determining the consecutive clock cycles with the same logical level of a signal sequence, i.e., a maximum allowable number of identical consecutive data values in the shift register when a dual frequency or dual phase code is used, or by logical gating, summation and shift, plus comparison of the result of the gating operations with a predefined value. In addition, code checking device 39 checks whether the bit pattern of first output signal 46 or second output signal 45 corresponds to that of a key word which is also stored in memory unit 40. Any new key words can be loaded and stored key words can be modified via data input 65. The key words are preferably encoded or determined by the time of their occurrence, for example, after a transmission pause, so that they cannot be mistaken for a data word to be transmitted. If such a key word occurs for the first time and it is recognized in code checking device 39, a first memory element 63 associated with first output signal 46 or a second memory element 64 associated with second output signal 45 is set. At the same time, a counter 69 is set to a predefined reset value. This counter is modified, for example, incremented by one, with each clock signal. When a key word is detected again for the same signal, the count of counter 69 at that time is compared to a reference value preferably stored in memory unit 40. If the count of counter 69 does not correspond to the reference value, an error is stored in first error memory 67 or second error memory 68, depending on whether first output signal 46 or second output signal 45 is involved. An error is also determined if counter 69 attains a reference value without a key word being detected again. The reference value of the counter can be defined as desired and stored in memory unit 40 also, for example, via data input 65. First memory element 63 and/or second memory element 64 are cleared when the corresponding first error memory 67 and/or second error memory 68 is set, since in this case it is not known whether a key word actually resulted in one of memory elements 63 or 64 being set or whether a transmission error has occurred. Memory elements 63, 64 and counter 69 can be cleared using a reset signal 66. If first memory element 63 or second memory element 64 is set, code checking device 39 detects a new key word and, if the count of counter 69 corresponds to the predefined reference value, confidence signal 70 is set. Confidence signal 70 signals that the validity of an output signal has been successfully checked. The confidence signal is reset when the corresponding conditions are no longer met. Whenever an output signal has been successfully compared with a key word by code checking device 39, counter 69 is reset to the predefined reset value and confidence signal 70 is set. In code checking device 39, the occurrence of a code error and/or a key word error at first input 32 or input 36, i.e., in first output signal 46 and/or second output signal 45, is stored, as described above, in first and second error memories 67, 68 associated with these two inputs. Error memories 67, 68 are only cleared again by reset signal 66.

If only one of the two error memories 67, 68 is set, selection signal 60 is activated accordingly by selector 71 in order to select an output signal 45 or 46, recognized as error-free, via switching device 31 and to store this selection in memory device 59. If the code check has not yet been completed or no error has been detected, both signals may be stored in memory device 59 first. After the check has been completed, the valid output signal is selected from the memory with the help of selection signal 60; a preferred value, for example, first selection signal 46, is determined and stored for the case where both output signals are valid. If the output signal to be further processed has been determined, only the selected output signal to be further processed is relayed to memory device 59 via an output 43 of switching device 31. If both error memories 67 and 68 are set, an error is signaled via error signal 72. The same error signal 72 becomes active when neither of the two error memories 67, 68 is set, but the sets of data are not identical, as can be signaled to selector 71 via comparison signal 55.

Figure 4:
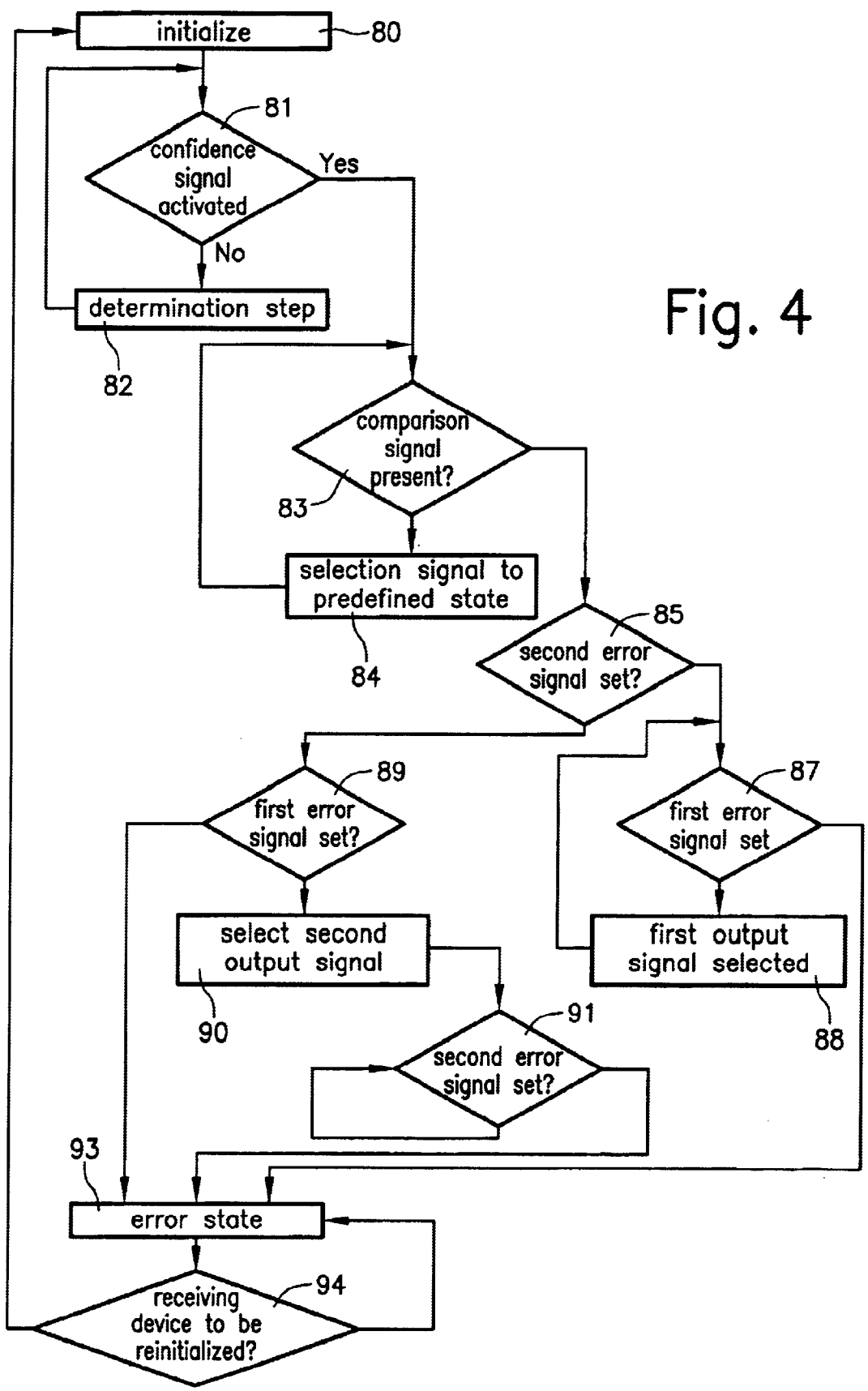
FIG. 4 shows a checking sequence according to the present invention in the checking device.

FIG. 4 shows a flow chart of the example method according to the present invention for incoming data. The data transmitted to the checking device, i.e., output signals 45, 46 of shift registers 22, 24 are checked on an ongoing basis during the method described and a check result is communicated accordingly to selector 71 via the respective memory cells. In an initialization step 80, all counters and those memory cells that are variable during data reception are reset to an initial value, as are confidence signal 70, the error signal and selection signal 60. The initialization step is followed by a first checking step 81, in which it is checked whether confidence signal 70 has been activated. If this is not the case, the procedure branches off to a determination step 82, in which it is determined whether a key word has been detected twice at least at one of the two inputs 32, 36 and whether the count of counter 69 coincided with the reference value at the time of the second check and of each subsequent check. If this is the case, confidence signal 70 is set in determination step 82. Then the procedure branches back to the first checking step. If in first checking step 81 it is determined that the confidence signal is present, the procedure branches off to a second checking step 83, in which it is checked whether comparison signal 55 is present, i.e., if all the data received so far is the same. If this is the case, the procedure goes to a first selection state 84, in which selection signal 60 is set to a predefined value, e.g., to first output signal 46. Subsequently, the procedure branches back to second checking step 83. If it is determined in second checking step 83 that the data is not the same, the procedure branches off to a third checking step 85, in which it is checked whether second error signal 62 has been set. If it is determined in third checking step 85 that second error signal 62 has not been set, the procedure branches off to a fourth checking step 89, in which first error signal 61 is checked. If first error signal 61 has been set, the procedure branches off to a second selection state 90, in which selection signal 60 is set so that second output signal 45 is selected. In a subsequent fifth checking step 91 it is checked whether second error signal 62 has still not been set. If second error signal 62 has still not been set, fifth checking step 91 is repeated. If, in fifth checking step 91, it is determined that second error signal 62 has now been set, an error state 93 is assumed, since now an error of both output signals has been determined. In error state 93, error signal 72 is set. Also if, in fourth checking step 89, it is determined that first error signal 61 has not been set, the procedure branches off to error state 93 and error signal 72 is set, since, while the sets of data are different, no error was detected in either of the two signals. If, in third checking step 85, it is determined that second error signal 62 has been set, it is checked, in a sixth checking step 87 whether first error signal 61 has also been set. If first error signal 61 has been set, error state 93 is also reached, since both signals contain errors. If, in sixth checking step 87, it is determined that the first error signal is inactive, the procedure branches off to a third selection state 88, in which selection signal 60 is set so that first output signal 46 is selected by selection signal 60. Subsequently the procedure branches back to sixth checking step 87. A seventh checking step 94 is performed starting from error state 93, in which it is checked whether the receiving device is to be re-initialized. For example, a command required to do so is relayed to checking device 33 by arithmetic unit 13, for example, by triggering reset signal 66, and the procedure branches off to initialization step 80.

In another embodiment, fifth and sixth checking steps are performed only if the system is in second or third selection state 90, 88 if changes occur in the architecture of the bus system, for example, due to increased or reduced bus length, change in the behavior of the bus over time, for example, due to the activation or de-activation of individual components, change in the bus load, the line capacity, or addition or removal of individual applications, i.e., when the delay conditions on the bus remain constant.

In another embodiment, it is also possible to transmit key words only for determining the time conditions on the bus and the resulting phase shift of the data signal. In the same way, it is also possible to use another code, for example, a code that is easier to check, for the encoding after the completion of the checking procedure or for the ongoing checking. The code redundance can also be reduced at the expense of the error detection in order to increase the data transmission capacity. Both the key words and the encoding are optionally used for test purposes only in this case, in order to determine the phase shift between data signal and clock pulse. A subsequent, optionally unencoded, transmission and optionally also the omission of periodic key words is possible without errors if the delay conditions on the bus no longer change.

What is claimed is:

1. A method for receiving data, comprising:
   receiving via a receiving device a signal, the signal having a constant frequency at least part of the time, the receiving device including a first readout device and a second readout device, the signal being read via the first readout device and being read via the second readout device, the reading via the second readout device being offset in time relative to the reading by the first readout device via at least one switching period of the first readout device and the second readout device, each of the first readout device and the second readout device providing an output signal;
   checking validity of the output signal of the first readout device and the output signal of the second readout device; and
   selecting as a valid signal one of the output signal of the first readout device and the output signal of the second readout device as a function of the checking.

2. The method according to claim 1, wherein the signal is read by the first readout device in a first clock pulse at the frequency, and the signal is read by the second readout device in a second clock pulse at the frequency.

3. The method according to claim 2, wherein a phase of the first clock pulse is shifted by half a period with respect to a phase of the second clock pulse.

4. The method according to claim 2, wherein the first clock pulse and the second clock pulse are defined by a square signal, and the second clock pulse is obtained by inversion of the first clock pulse.

5. The method according to claim 1, wherein the signal is read by the first readout device with a first clock edge and the signal is read by the second readout device with a second clock edge.

6. The method according to claim 1, further comprising:
   controlling a switching device using a checking device, the valid signal being selected by the switching device.

7. The method according to claim 6, wherein information regarding the selected signal is stored in the checking device.

8. The method according to claim 6, wherein the signal is received by the receiving device in an encoded form.

9. The method according to claim 8, wherein the checking the validity step includes checking validity of a code of the signal.

10. The method according to claim 1, further comprising:
    receiving by the receiving device key words for determining the validity of the output signal of the first readout device and the output signal of the second readout device.

11. The method according to claim 10, wherein the keywords are received after a predefinable time period.

12. The method according to claim 1, further comprising:
    determining a check value from data received in the signal, wherein the validity of the output signal of the first readout device and the output signal of the second readout device is determined by comparing the check value with a stored value.

13. The method according to claim 1, further comprising:
    outputting by a checking device an error signal if the output signal of at least one of the first readout device and the second readout device is not valid.

14. The method according to claim 1, further comprising:
    determining at least one of a first clock pulse and a second clock pulse from data of the signal.

15. The method according to claim 6, further comprising:
    receiving by a checking device data via which the validity of the output signal of the first readout device and the output signal of the second readout device is determined.

16. A method for receiving data in a data bus, comprising:
    receiving over the data bus via a receiving device a signal having a constant frequency at least part of the time, the receiving device including a first readout device and a second readout device, the signal being read via the first readout device and being read via the second readout device, the reading via the second readout device being offset in time relative to the reading by the first readout device via at least one switching period of the first readout device and the second readout device, each of the first readout device and the second readout device providing an output signal;
    checking validity of the output signal of the first readout device and the output signal of the second readout device; and
    selecting as a valid signal one of the output signal of the first readout device and the output signal of the second readout device as a function of the checking.

17. A device for receiving data, comprising:
    a first readout device reading a signal, the signal having a constant frequency at least part of the time;
    a second readout device reading the signal at a time offset relative to the reading of the signal by the first readout device, each of the first readout device and the second readout device providing an output signal;
    a validity checker checking validity of the output signal of the first readout device and the output signal of the second readout device; and
    a selector selecting as a valid signal one of the output signal of the first readout device and the output signal of the second readout device as a function of the checking.

18. The device according to claim 17, wherein the first readout device is a first shift register and the second readout device is a second shift register.

19. The device according to claim 17, wherein the validity checker receives a code to check the validity of the output signal of the first readout device and the output signal of the second readout device.

* * * * *